United States Patent
Farawila et al.

(10) Patent No.: US 8,576,975 B2
(45) Date of Patent: Nov. 5, 2013

(54) PROTECTION OF REACTOR CORES FROM UNSTABLE DENSITY WAVE OSCILLATORS

(75) Inventors: Yousef M. Farawila, Richland, WA (US); Douglas W. Pruitt, Pasco, WA (US)

(73) Assignee: Areva NP Inc., Lynchburg, VA (US)

( * ) Notice: Subject to any disclaimer, the term of this patent is extended or adjusted under 35 U.S.C. 154(b) by 0 days.

(21) Appl. No.: 13/367,453

(22) Filed: Feb. 7, 2012

(65) Prior Publication Data

US 2012/0140864 A1 Jun. 7, 2012

Related U.S. Application Data

(62) Division of application No. 11/109,064, filed on Apr. 18, 2005, now Pat. No. 8,135,106.

(60) Provisional application No. 60/564,894, filed on Apr. 23, 2004.

(51) Int. Cl.
  *G21C 9/00* (2006.01)
(52) U.S. Cl.
  USPC .......................................... 376/260; 376/277
(58) Field of Classification Search
  USPC ................................................. 376/215, 216
  See application file for complete search history.

(56) References Cited

U.S. PATENT DOCUMENTS

| | | | | |
|---|---|---|---|---|
| 4,337,118 A | * | 6/1982 | Sakurai et al. | 376/210 |
| 5,141,710 A | * | 8/1992 | Stirn et al. | 376/254 |
| 5,174,946 A | * | 12/1992 | Watford et al. | 376/216 |
| 5,524,128 A | * | 6/1996 | Mowry et al. | 376/236 |
| 5,528,639 A | * | 6/1996 | Eckert et al. | 376/216 |
| 5,555,279 A | * | 9/1996 | Nir et al. | 376/216 |
| 5,875,221 A | * | 2/1999 | Kreuter et al. | 376/215 |
| 5,978,429 A | * | 11/1999 | Kreuter et al. | 376/242 |
| 6,122,339 A | * | 9/2000 | Kreuter et al. | 376/216 |
| 6,173,026 B1 | * | 1/2001 | Mowry et al. | 376/254 |
| 6,198,786 B1 | * | 3/2001 | Carroll et al. | 376/211 |
| 6,339,629 B1 | * | 1/2002 | Takeuchi et al. | 376/254 |
| 6,608,878 B1 | * | 8/2003 | Schulze | 376/214 |
| 6,611,572 B2 | * | 8/2003 | Bolger et al. | 376/216 |
| 6,674,825 B2 | * | 1/2004 | Bolger et al. | 376/216 |
| 2002/0154724 A1 | * | 10/2002 | Fukasawa | 376/216 |

OTHER PUBLICATIONS

ORNL Technical Report, ORNL/TM-12130 "Density-Wave Instabilities in Boiling Water Reactors," Sep. 1992 p. 1-45.*
ORNL Technical Evaluation Report, ORNL/NRC/LTR-92/15, "Licensing Basis for Long-Term Solutions to BWR Stability Proposed by BWR Owner's Group," Aug. 1992. pp. 1-28.*
GE to NRC 01-02NRC.DOC MFN 01-046 Aug. 31, 2001 "Stability Reload Licensing Calculations Using Generic DIVOM Curve," p. 1-9.*

(Continued)

*Primary Examiner* — Jack W Keith
*Assistant Examiner* — Sean P Burke
(74) *Attorney, Agent, or Firm* — Kenyon & Kenyon LLP

(57) ABSTRACT

The present invention provides a method of operating a Boiling Water Reactor, having the steps of analyzing LPRM signals for oscilliatory behavior indicative of neutron-flux-coupled density wave oscillations, determining if oscilliatory behavior is present in the signals; initiating a reactor protective corrective action if the oscilliatory behavior is determined, and in addition, initiating corrective actions if neutron uncoupled oscillations are possible. Detecting the later is performed through analytically determined exclusion zone on the power flow map or by on-line stability calculations for several high power channels.

12 Claims, 3 Drawing Sheets

(56) References Cited

OTHER PUBLICATIONS

Wulff et al., "BWR stability analysis with the BNL Engineering Plant Analyzer," NUREG/CR-5816.*

Sanchez-Gasca et al., "Multivariable Controls for Damping Interarea Oscillations in Power Systems," IEEE Control Systems Magazine. vol. 9, Issue 1. pp. 28-32.*

PCT International Search Report mailed on Sep. 25, 2007, for PCT/US2005/14117.*

Supplemental European Search Report mailed on Jun. 25, 2010 for European Patent Application No. 05856646.*

Paniagua et al., "Modeling of Thermal Hydraulic Instabilities in Single Heated Channel Loop During Startup Transients," Nuclear Engineering and Design, vol. 193, pp. 207-226, 1999, Elsevier Science S.A.*

Oguma, R., "Investigation of Power Oscillation Mechanisms based on Noise Analysis of Forsmark-1 BWR," Ann. Nucl. Energy, vol. 23, Issue 6, pp. 469-485, 1996.*

Kurita et al., "Multiple Time-Scale Power System Dynamic Simulation," IEEE Transactions on Power Systems, vol. 8, No. 1, Feb. 1993, pp. 216-223.*

Oak Ridge National Laboratory Technical Report, ORNL/TM-12130, also NUREG/CR-6003, titled "Density-Wave Instabilities in Boiling Water Reactors," Sep. 1992 (manuscript completed Jun. 1992) pp. 1-45.

Oak Ridge National Laboratory Technical Evaluation Report, ORNL/NRC/LTR-92/15, on "Licensing Basis for Long-Term Solutions to BWR Stability Proposed by BWR Owners' Group," Aug. 1992. pp. 1-28.

GE to NRC 01-02NRC.DOC MFN 01-046 Aug. 31, 2001 "Stability Reload Licensing Calculations Using Generic DIVOM Curve". pp. 1-9.

Wulff et al., "BWR stability analysis with the BNL Engineering Plant Analyzer", NUREG/CR-5816 Abstract. Jan. 7, 2007.

Sanchez-Gasca et al., "Multivariable Controls for Damping Interarea Oscillations in Power Systems", IEEE Control Systems Magazine. vol. 9, Issue 1. Jan. 1989. pp. 28-32.

Supplementary European Search Report mailed on Jun. 25, 2010 for European Patent Application No. 05856646.

Paniagua et al., "Modeling of thermal hydraulic instabilities in single heated channel loop during startup transients", Nuclear Engineering and Design, vol. 193, pp. 207-226, 1999, Elsevier Science S.A.

Oguma, R., "Investigation of Power Oscillation Mechanisms based on Noise Analysis at Forsmark-1 BWR", Ann. Nucl. Energy, vol. 23, Issue 6, pp. 469-485, 1996.

Kurita et al., "Multiple Time-Scale Power System Dynamic Simulation", IEEE Transactions on Power Systems, vol. 8, No. 1, Feb. 1993, pp. 216-223.

* cited by examiner

PROTECTION OF REACTOR CORES FROM UNSTABLE DENSITY WAVE OSCILLATORS

RELATED APPLICATIONS

This application is a division of U.S. patent application Ser. No. 11/109,064, filed Apr. 18, 2005 now U.S. Pat. No. 8,135,106, which claims benefit of U.S. Provisional Application No. 60/564,894 filed Apr. 23, 2004. The teachings of those applications are incorporated herein by reference in their entirety.

FIELD OF THE INVENTION

The present invention relates to Boiling Water Reactor nuclear power plants. In particular, the present invention relates to protecting Boiling Water Reactor cores from unstable density wave oscillations that may cause the reactor core to exceed thermal limits and cause fuel damage.

BACKGROUND INFORMATION

Boiling Water Reactors (BWR's) designed for power generation utilize fuel assemblies arranged inside vertical channels through which water coolant flows. Each of the fuel assemblies consists of a plurality of vertical rods arrayed within the vertical channels. The vertical rods are sealed cylindrical tubes which have ceramic pellets of fissionable material, (e.g., uranium oxide), stacked inside. The water flows upward in the channels and removes the heat generated in the pellets by the fission of the heavy isotopes. In addition to its cooling function, the water serves as a neutron moderator. The moderator function is achieved as the neutrons produced in the fission process collide with the hydrogen atoms in the water molecules and slow down to lower energies which increase the probability of inducing further fission reactions and the fission chain reaction is sustained.

In Boiling Water Reactors, the water is allowed to boil as it travels up in the fuel assembly channel. The density of water is reduced by the boiling process and the moderating function is reduced accordingly.

In the normal mode of operation of Boiling Water Reactors, the coolant flow rate through the fuel channels is steady and stable. However, departure from steady configuration is likely under reduced coolant flow operation, particularly when power levels are relatively high. Such operating conditions are encountered during reactor startup and as a result of recirculation pumps tripping an anticipated transient. The mechanism of the instability is associated with the so called density waves and is described as follows. Boiling Water Reactor fuel assemblies have a vertical boiling channel with initially steady inlet water flow rate. The density profile of the two phase mixture is one of monotonically decreasing density as function of elevation and is fixed in time. The density of the coolant at the exit of the channel is higher for higher coolant flow rate and is lower for higher power. Given a small perturbation in inlet flow rate, a corresponding perturbation in coolant flow density takes place at the boiling boundary and the density perturbation travels up the channel with the coolant flow, causing the density wave. The resistance to coolant flow increases substantially with decreasing flow density for the same mass flow rate. The density wave therefore affects the distribution of flow resistance along a boiling channel. In the specific case where the density wave travel time to the upper part of the channel coincides with the reversal of the inlet flow perturbation, a resonance effect results and the flow resistance change reinforces the original perturbation. The magnitude of the reinforcement is larger for high net density change, i.e. power to flow ratio, and can be sufficiently large to cause diverging flow oscillations, where the ratio of the magnitude of flow change at the peak of one cycle to that of the previous cycle (known as decay ratio) exceeds unity.

In a Boiling Water Reactor, the density waves cause corresponding changes in the moderating function of the coolant and periodically alter the reactivity of the core. The alternating reactivity results in corresponding neutron flux and power oscillations. These power oscillations filter through the fuel pellets, with damping and time delay caused by the heat diffusion process, and result in fuel surface heat flux oscillations. The heat flux oscillations interact with the density wave and generally reinforce it. It is noted that fuel rods of smaller diameter reduce the filtering effect and have an adverse effect on stability.

Early Boiling Water Reactor fuel designs utilized a simple array of 7×7 rods in a regular square lattice. The power density was relatively low, as the linear heat generation rate was relatively high, which forced the reactor power level to remain low to avoid set thermal limits. Newer designs use larger numbers of rods, specifically 8×8, 9×9, and 10×10 rod arrays. The increased number of rods resulted in decreasing the linear heat generation rate and permitted the fuel channel power density to increase, however, the increased number of rods resulted in two adverse effects:

The first adverse effect of increasing the number of rods is that the diameter of each rod is reduced. This results in proportional reduction in heat conduction time constant and reduces its stabilization effect.

The second adverse effect of the increase of the number of fuel rods in later designs is the increase of the coolant pressure drop as the hydraulic diameter of the subchannels is reduced. The two phase flow resistance in the upper part of the flow channel is increased, which results in reduced hydraulic stability.

The development of large magnitude flow oscillations due to unstable density waves cannot be tolerated in a Boiling Water Reactor as it results initially in cyclical dryout and rewetting of the fuel surface and may lead to irreversible dryout. The occurrence of irreversible dryout leads to clad temperature increase and clad failure and release of radioactive material from therein. For this reason, Boiling Water Reactor plants take measures to guard against instabilities. These measures are:

1. Define by using computer simulations the boundaries of one or more exclusion zones on the power flow map, where neutron coupled density wave instabilities of the global or regional types are possible, and restrict operation in said zones.
2. Install hardware that accesses the neutron flux signals, and use these signals to determine if oscillatory behavior is present, in which case protective measures such as reactor scram are taken.

There is therefore a need to provide a design that prevents density waves in Boiling Water Reactors while not exclusively dependent on their coupling to neutron flux signals.

SUMMARY

It is therefore an objective of the present invention to prevent density waves in Boiling Water Reactors. The present invention provides a method of operating a Boiling Water Reactor comprising analyzing LPRM (Local Power Range Monitor) signals for oscillatory behavior indicative of neutron-flux-coupled density wave oscillations, determining if oscillatory behavior is present in the signals; initiating a reactor protective corrective action if the oscilliatory behavior is determined, locating operating power and coolant flow relative to a boundary of an exclusion zone above which neutron-flux-uncoupled oscillations are possible, and initiating a reactor protective corrective action if neutron flux uncoupled oscillations are possible.

The present invention also provides a method of operating a Boiling Water Reactor, comprising the steps of analyzing LPRM signals for oscilliatory behavior indicative of neutron-flux-coupled density wave oscillations, determining if oscilliatory behavior is present in the signals, initiating a reactor protective corrective action if the oscilliatory behavior is determined, analyzing several channels of high power using a stability program on-line at actual operating conditions and checking to determine if neutron flux uncoupled oscillations are possible, and initiating a reactor protective corrective action if neutron flux uncoupled oscillations are possible.

Compliance with General Design Criteria GDC 10 and 12 of 10 C.F.R. 50 Appendix A precludes operating a Boiling Water Reactor under oscillatory conditions. Detect and Suppress systems have been installed in many Boiling Water Reactor such systems issue scram signals upon detecting oscillatory neutron flux signals using grouped Local Power Range Monitors (LPRM). These systems neglect protection against pure thermal hydraulic unstable density waves which are virtually uncoupled to neutron signals and are therefore virtually undetectable using LPRM's. The discovery of the existence of such unstable waves and their decoupling from the detection system is the impetus behind the present invention. The present invention relates to the unstable thermal hydraulic density waves virtually uncoupled to neutron flux variations and a method for protecting Boiling Water Reactors against same. The new system offers complete protection by combining two concepts, namely "Detect and Suppress" and "Anticipate and Suppress" where each protection concept targets specific modes of oscillations. The "Anticipate and Suppress" function relies on computerized methods for defining conditions under which growing single channel hydraulic oscillations may occur, and issues a scram signal to suppress the same. Other operating conditions for which single channel oscillations are not possible while coherent core wide or regional mode oscillations coupled with neutron flux are possible, are left to the "Detect and Suppress" function to recognize and issue scram signals to prevent their growth beyond safe operating limits.

In accordance with the present invention, a mode of operating Boiling Water Reactors is identified in which unstable hydraulic density wave oscillations grow in magnitude while being virtually uncoupled to the neutron flux or the signal derived therefrom owing to its frequency being generally different from the frequency of the prevailing coherent oscillation modes which are coupled with neutron flux and power oscillations. This invention also offers an arrangement for protecting against said neutron-uncoupled density waves by separating them from the coherent oscillation types. According to this invention, the detect and suppress methods are simplified to account for neutron coupled modes only, while explicit protection from the neutron uncoupled mode is left to computerized analytical methods which are described hereafter in detail.

DETAILED DESCRIPTION

Figure 1:
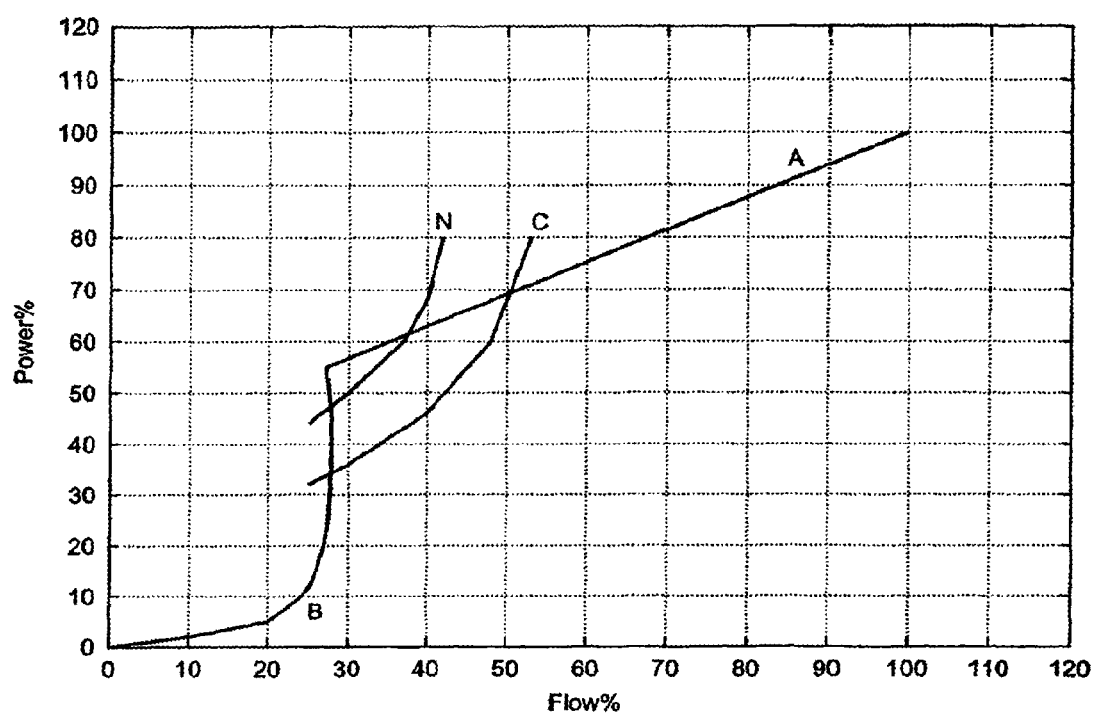
FIG. 1 is an illustration of a power-coolant flow operating map of a Boiling Water Reactor.
Figure 2:
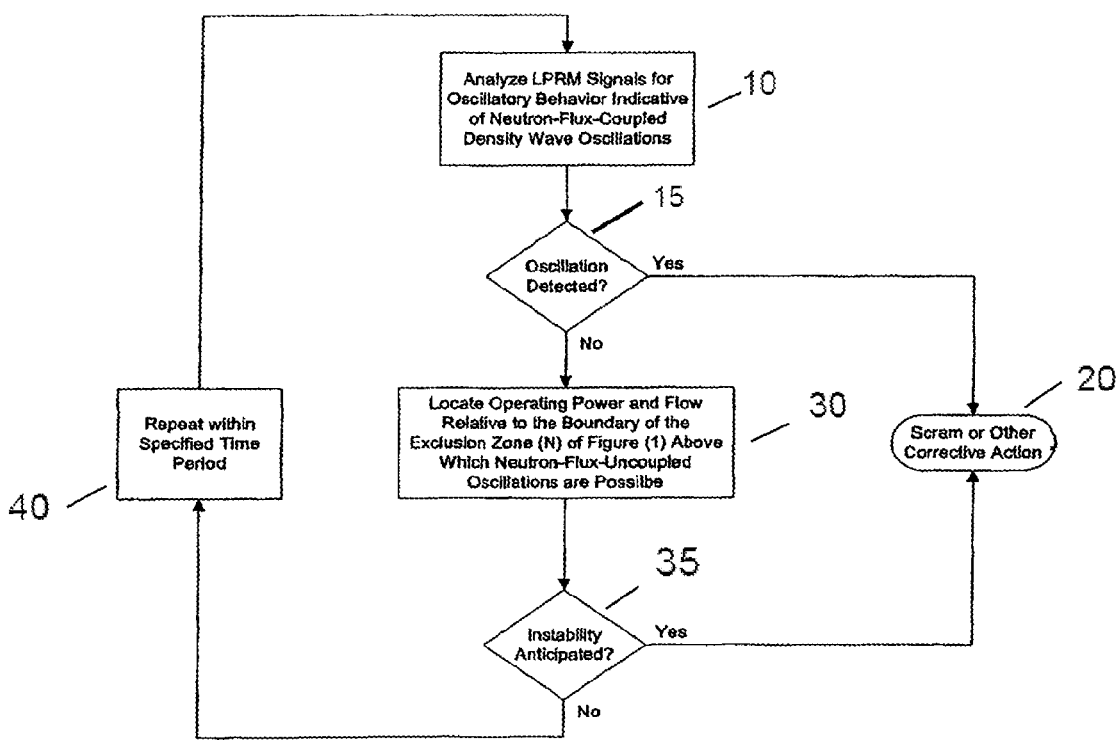
FIG. 2 is a flow diagram of the logical algorithm for protecting Boiling Water Reactor plants against the growth of all possible unstable modes in the first embodiment.
Figure 3:
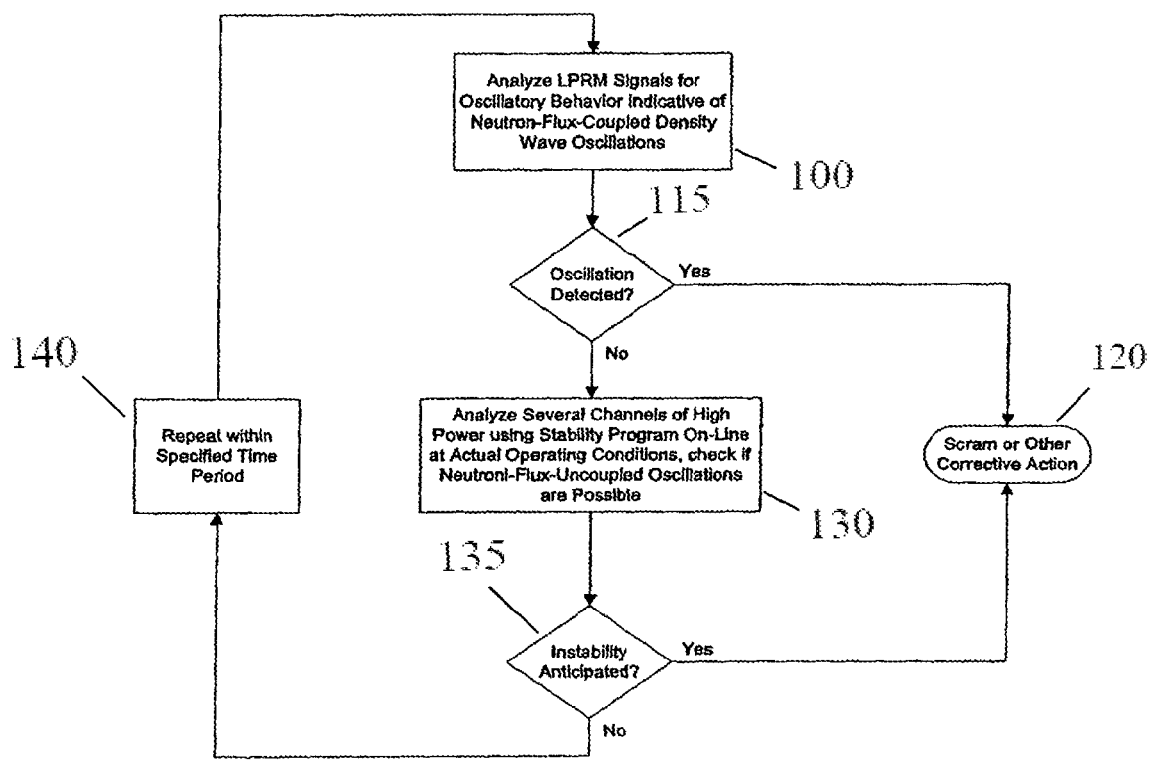
FIG. 3 is a flow diagram of a logical algorithm for protecting Boiling Water Reactor plants against the growth of all possible unstable oscillation modes in the second embodiment.

FIG. (1) represents a power coolant flow operating map of a typical BWR. The nearly straight line (A) is defined as a control rod line, which represents a power flow relationship as flow forced by running pump(s) changes for a fixed control rod pattern. The curved line (B) represents the power coolant flow relationship under natural circulation, where the pumps are not running Curve (C) represents the boundary of the exclusion zone typical of the prior art, which divides the power coolant flow map into a stable region under the curve and potentially unstable region above the curve, where unstable regions are defined by neutron coupled modes. Curve (N) represents the boundary of the new exclusion zone according to the present invention, which divides the power coolant flow map into a stable region under the curve and potentially unstable region above the curve, where unstable is defined by a neutron uncoupled density wave mode. The advantage of the present invention lies in the size of the restricted or excluded region being smaller than that of the prior art which allows for greater operation flexibility.

FIG. (2) is a logical flow diagram of an algorithm for protecting Boiling Water Reactor plants against the growth of all possible unstable modes in the first embodiment. The first step 10 is analyzing a set of LPRM neutron signals and issue a scram 20 (or any other corrective action such as power reduction) if the neutron flux signals indicate oscillatory behavior as determined in step 15. In case the neutron flux signals were not found to be oscillatory beyond noise levels, which indicates that neutron coupled modes are not excited, the algorithm goes to step 30. Step 30 is a check of whether the operating power and coolant flow point lie above the exclusion boundary denoted by (N) in FIG. (1), and issue a corrective action accordingly 20 when instability is anticipated as provided in step 35. When the algorithm passes through the two logical checks with negative indication of instabilities, the process is repeated 40 periodically at a period sufficiently small to preclude the growth of instabilities within a period to a degree sufficient to challenge the thermal operating limits of the plant. It must be noted that the above mentioned steps can be applied to run in sequence or in parallel, on the same computer processor or on separate one.

FIG. (3) is a logical flow diagram of an algorithm for protecting BWR plants against the growth of all possible unstable modes in the second embodiment. Step 100 comprises analyzing a set of LPRM neutron signals and issuing a scram (or any other corrective action such as power reduction) 120 if the neutron flux signals indicate oscillatory behavior as determined in step 115. In the instance that neutron flux signals are not found oscillatory beyond noise levels, which means neutron coupled modes are not excited, the algorithm proceeds to the next step 130. Step 130 is a check of whether the operating conditions (power, axial power profile, coolant flow, inlet temperature and pressure) of any of a preset number of channels characterized by relatively high power can undergo neutron uncoupled density wave oscillations. The operating conditions are obtained from the on line monitoring computer programs. In the case the density wave stability algorithm indicates possible instability in any of the channels as queried in step 135, a scram signal or any other corrective action such as power reduction is issued in step 120. When the algorithm passes through the two logical checks with negative indication of instabilities, the process is repeated periodically at a period sufficiently small to preclude the growth of instabilities within a period to a degree sufficient to challenge the thermal operating limits of the plant in step 140. It must be noted that the above mentioned steps can be applied to run in sequence or in parallel, on the same computer processor or on separate one. Similarly, the stability calculation for each of the identified channels can be executed in sequence or in parallel using more than one computer processor.

The present invention also provides a protection against a mode of operating a Boiling Water Reactor where the flow entering a single or few fuel channels undergoes growing oscillations due to unstable density waves along the channels where the magnitude of the density variations is too small for effective coupling to neutron flux modulation via feedback mechanisms which makes neutron detectors ineffective in detecting the oscillations.

The present invention also provides a method for protecting Boiling Water Reactors from neutron uncoupled hydraulic oscillations by automatically issuing a shut down scram or power reduction signal upon reaching conditions where said oscillations are deemed possible by analytical means.

The present invention also defines the conditions under which neutron uncoupled hydraulic oscillations is possible in at least one channel of a Boiling Water Reactor in which the boundaries of an exclusion zone on the operating power coolant flow map is calculated using computer programs simulating hydraulic density waves, inside the exclusion zone the simulated decay ratio is greater than a preset limit.

The present invention also provides a method for defining the conditions under which neutron uncoupled hydraulic oscillations are possible in at least one channel of a Boiling Water Reactor in which the so called decay ratio for each of several top candidate channels characterized by high power relative to other co resident channels is calculated on line using computer simulations, and a scram or power reduction signal is issued in case any of the calculated channel decay ratios exceed a pre set limit.

The present invention detects power oscillations and suppresses them via control rod insertions where the system protection parameters are tuned to allow sufficient time for suppressing coherent neutron flux coupled hydraulic oscillations while excluding neutron uncoupled channel oscillation modes. This tuning is achieved by using computer simulations of reactor oscillations to produce a relationship between the power oscillation magnitude and critical power ratio ("CPR") where the neutron uncoupled hydraulic oscillations are excluded.

Unstable density waves can grow to a large magnitude sufficient to challenge the thermal safety limit, while being virtually undetectable via neutron flux signals due to the weak level of interaction given that only a relatively small numbers of channels undergo such oscillations and the excited neutron flux levels are below or comparable to the noise level customary found in neutron signals. This fact identifies a major deficiency in the prior art which depends on neutron signals exclusively to identify oscillations.

According to the present invention, the Detect and Suppress solution is improved fundamentally by performing the Delta CPR/Initial CPR Vs. Oscillation Magnitude (DIVOM) analysis to account exclusively for the neutron coupled modes known as the global and regional modes of power oscillations. This results in a calculated DIVOM curve of relatively small slope that allows the Detect and Suppress functions to be performed smoothly with a high degree of reliability without the problem of false identification of oscillations that can impact the continuity of operation of the power plant. The Detect and Suppress function is augmented by an additional function to prevent the neutron uncoupled oscillation mode. This augmentation cannot rely on the LPRM signals by virtue of the fundamental nature of the instability being virtually uncoupled to the neutron flux signals. Rather, the protection relies on analytical simulations and the protection is that of Anticipate and Suppress. This can be done in several methodologies, two of which are described herein.

In the first embodiment, analytical simulations are performed a priori for each operating cycle or on generic basis for each plant where a sufficient number of possible operational conditions are covered. The analytical simulations identify a zone on the power coolant flow map where neutron uncoupled oscillations are possible. This zone lies above the curve (N) in FIG. (1). The exclusion zone above the curve is smaller than the one of the prior art shown in the same figure as curve (C), which improves the operational flexibility considerably. By using this analytically based exclusion method to avoid neutron uncoupled oscillations and in the same time using the Detect and Suppress to guard against the neutron coupled modes, this invention provides for complete protection against all possible oscillation modes. The flow chart of the first embodiment is given as FIG. (2).

The second embodiment differs from the first embodiment in that an on line algorithm is used to calculate the stability of the neutron uncoupled modes instead of calculating the same in advance to create an a priori exclusion zone. In that manner the exclusion zone is determined on actual conditions instead of the worst of all possible operating conditions and thus relieves the plant operator from additional unnecessary conservatism. The stability algorithm receives input from the plant monitoring computer, and the input for each analyzed channel consists primarily of the power, power profile, coolant flow rate, inlet flow temperature, and system pressure. The selection of the channels to be analyzed on line is based on their relative power level and the channels of the highest power will be selected. The number of selected channels is determined a priori by off line analysis to make sure that the proper number of candidate channels are selected for on line analysis. There is no limit however to the number of channels selected, and virtually all channels in the core can be analyzed provided that the analysis is complete within a time period sufficiently small that an incipient oscillation does not have enough time to grow to a level that may challenge the thermal safety limits. Use of parallel processing is a preferred way to ensure that all channels where oscillations are possible are analyzed within the time period. The flow chart of the second embodiment is given as FIG. (3).

What is claimed:

1. A method of operating a Boiling Water Reactor, said boiling water reactor having fuel assemblies arranged inside of channels through which coolant flows, comprising:
    a step of analyzing Local Power Range Monitor signals for oscillatory behavior indicative of neutron flux coupled density wave oscillations;
    determining if oscillatory behavior beyond a noise level is present in the signals;
    initiating a first reactor protective corrective action if the oscillatory behavior is determined to be present;
    if the Local Power Range Monitor signals analyzed in the step of analyzing Local Power Range Monitor signals are not oscillatory beyond noise level, a step of analyzing several channels of high power using a stability program on line at actual operating conditions and checking to determine if neutron flux uncoupled oscillations are possible; and initiating a second reactor protective corrective action while the Local Power Range Monitor signals are not oscillatory beyond noise level if it is determined in the step of analyzing several channels of high power that neutron flux uncoupled oscillations are possible; and repeating at least the step of analyzing Local Power Range Monitor signals if it is determined in the step of analyzing several channels of high power that neutron flux uncoupled oscillations are not possible.

2. The method according to claim 1, wherein at least one of the first step and the second step of initiating a reactor protective corrective action is scramming the reactor.

3. The method according to claim 1, wherein at least one of the first step and the second step of initiating a reactor protective corrective action is reducing reactor power.

4. The method according to claim 1, wherein the step of analyzing several channels of high power using a stability program on-line at actual operating conditions and checking to determine if neutron flux uncoupled oscillations are possible is performed by use of on-line computer simulations.

5. A method of operating a Boiling Water Reactor designed for power generation, said boiling water reactor having fuel assemblies arranged inside of channels through which coolant flows, said method comprising the steps of:

analyzing Local Power Range Monitor signals for oscillatory behavior indicative of neutron flux coupled density wave oscillations;

determining if oscillatory behavior is present in the signals;

initiating a first reactor protective corrective action if the oscillatory behavior is determined to be present; and, if the Local Power Range Monitor signals analyzed in the step of analyzing Local Power Range Monitor signals are not oscillatory beyond noise levels of said Local Power Range Monitor signals, performing the further steps of:

determining the identity of a plurality of channels which are operating at a relatively high power as compared to other channels;

analyzing the plurality of channels which are operating at a relatively high power using a stability program on-line at actual operating conditions and checking to determine if neutron flux uncoupled oscillations are possible;

initiating a second reactor protective corrective action while the Local Power Range Monitor signals are not oscillatory beyond noise levels if it is determined in the step of analyzing the plurality of channels which are operating at a relatively high power that neutron flux uncoupled oscillations are possible; and repeating at least the step of analyzing Local Power Range Monitor signals if it is determined in the step of analyzing the plurality of channels which are operating at a relatively high power that neutron flux uncoupled oscillations are not possible.

6. The method according to claim 5, wherein at least one of the first step and the second step of initiating a reactor protective corrective action is scramming the reactor.

7. The method according to claim 5, wherein at least one of the first step and the second step of initiating a reactor protective corrective action is reducing reactor power.

8. The method according to claim 5, wherein the step of analyzing the plurality of channels which are operating at a relatively high power using a stability program on-line at actual operating conditions and checking to determine if neutron flux uncoupled oscillations are possible is performed by use of on-line computer simulations.

9. The method according to claim 5, wherein the actual operating conditions comprise a channel operating condition selected from the group consisting of: power, axial power profile, coolant flow rate, inlet flow temperature, and system pressure.

10. The method according to claim 5, wherein the actual operating conditions comprise operating power and coolant flow.

11. The method according to claim 1, wherein the actual operating conditions comprise a channel operating condition selected from the group consisting of: power, axial power profile, coolant flow rate, inlet flow temperature, and system pressure.

12. The method according to claim 1, wherein the actual operating conditions comprise operating power and coolant flow.

* * * * *